July 3, 1923.
J. L. CROOK, JR
1,460,890
CALF FEEDER
Filed Aug. 24, 1921
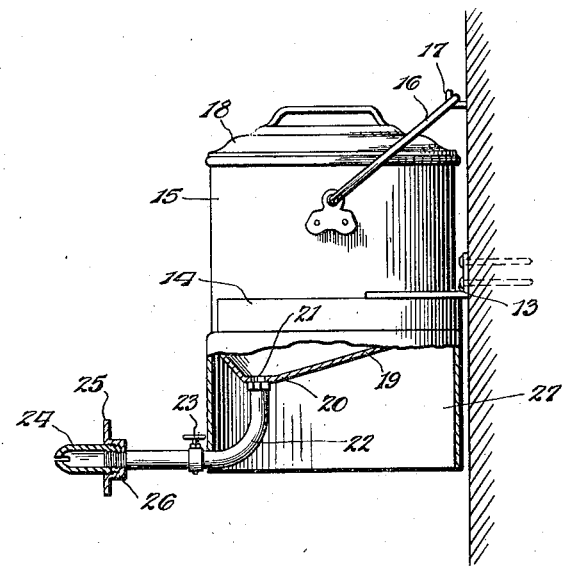
Inventor
J. L. Crook, Jr.
By
Lacey & Lacey, Attorneys

UNITED STATES PATENT OFFICE.

JERE L. CROOK, JR., OF JACKSON, TENNESSEE.

CALF FEEDER.

Application filed August 24, 1921. Serial No. 494,910.

*To all whom it may concern:*

Be it known that I, JERE L. CROOK, Jr., a citizen of the United States, residing at Jackson, in the county of Madison and State of Tennessee, have invented certain new and useful Improvements in Calf Feeders, of which the following is a specification.

This invention has for its object the provision of an inexpensive device by the use of which young calves may be easily fed and the milk or other liquid food maintained in a sanitary condition. The invention also has for its object the provision of means whereby the calf or other young animal will be prevented from swallowing the nipple or feeding tube, and also has for its object the provision of means whereby the withdrawal of the entire volume of liquid food will be assured. Other objects of the invention will appear incidentally in the course of the following description.

The invention is illustrated in the accompanying drawing which is a view, partly in side elevation and partly in section, showing one embodiment of the invention.

In carrying out my invention, I employ a container 15 having a bail or handle 16 adapted to be engaged over a suspending hook or similar device 17 upon a wall or other fixed support. I also provide a bracket 13 which is adapted to be secured to the wall or other fixed support and carries a collar 14 to embrace the container. The food is placed in the container through the top thereof in the usual manner, and the cover is fitted in the upper open end of the container to protect the food from contamination. The bottom 19 of the container is dished so as to drain to a point adjacent the front of the container, as shown at 20, an outlet opening 21 being formed in the bottom at said point. A feeding tube 22 is secured to the bottom 19 in direct communication with the opening 21 and is preferably a plain bent pipe, as shown. A cut-off 23 is provided in the pipe at the outer side of the container so as to control the flow of liquid through the feeding tube, and upon the outer extremity of the feeding tube, I secure a nipple 24 equipped with a guard disk 25. The disk 25 may be constructed of metal and threaded onto the feeding tube, and the nipple 24 is constructed to be secured upon the pipe 22 and housed within the hub portion 26 of the guard. The container is constructed with a depending rim or wall 27 whereby injury to the bottom 19 and the feeding tube will be prevented. The guard disk should be of an appreciably greater diameter than the nipple so that it cannot readily enter the mouth of the feeding animal and will, consequently, prevent the animal drawing the nipple into his throat in the process of feeding.

It will be readily seen from the foregoing description, taken in connection with the accompanying drawings, that I have provided a very simple and inexpensive apparatus whereby calves or other young animals may be fed without waste of milk or other food and without exposing the food to contamination. The entire contents of the container may be withdrawn by the animal and by placing measured quantities of food within the container the proper feeding of the animal will be insured. It will also be readily noted that the several parts of the device are simple in their construction so that they may be readily cleaned after the container has been used, and it may be further noted that, by employing the threaded connections the several parts may be easily removed when cleaning is desirable.

Having thus described the invention, what is claimed as new is:

An animal feeder comprising a container having a dished bottom and an annular wall depending around the said bottom, a feeding tube leading from the low point of the said dished bottom through the said depending wall, a nipple carried by the outer end of said feeding tube, a guard disk fitted around the said nipple, and a cut-off in the feeding tube.

In testimony whereof I affix my signature.

JERE L. CROOK, JR. [L. S.]